US005252023A

United States Patent [19]

Kelly

[11] Patent Number: 5,252,023

[45] Date of Patent: Oct. 12, 1993

[54] LIFTING APPARATUS

[76] Inventor: Kevin M. Kelly, 2 Glen St., New Hartford, N.Y. 13413

[21] Appl. No.: 833,101

[22] Filed: Feb. 10, 1992

[51] Int. Cl.[5] ........ B65G 7/00

[52] U.S. Cl. ........ 414/785; 294/67.1; 414/607; 187/9 R

[58] Field of Search ........ 294/67.1, 63; 414/785, 414/787, 607, 608, 722; 187/9 R, 9 E; 248/687

[56] References Cited

U.S. PATENT DOCUMENTS 2,659,506 11/1953 Watkins .

3,070,248 12/1962 Mitchell ........ 414/785

3,591,028 7/1971 McClung, Jr. ........ 414/607 X 3,709,394 1/1973 Strandberg ........ 414/785

3,734,329 5/1973 Grelck .

3,777,923 12/1973 Padgett .

3,897,097 7/1975 Davis, Jr. ........ 294/67.1 X 3,918,600 11/1975 Lyon .

*Primary Examiner*—Frank E. Werner

*Attorney, Agent, or Firm*—Wall and Roehrig

[57] ABSTRACT

Apparatus for supporting and lifting a load that includes a pair of spaced-apart, L-shaped forks. The horizontal leg of each fork contains a series of longitudinally-extended grooves formed in the load contacting top surface thereof. The grooves reduce the load contacting area of the top surfaces by about 40 percent thereby increasing the frictional forces acting between the load and the forks.

4 Claims, 2 Drawing Sheets

LIFTING APPARATUS

BACKGROUND OF THE INVENTION

This invention relates generally to lifting devices and, in particular, to load supporting and lifting forks for use in such lifting devices.

More specifically, this invention relates to forks suitable for use in forklift trucks of the type generally used to lift and transport flat loads or load bearing pallets. Most forklift trucks employ a pair of L-shaped forks that are mounted in spaced-apart alignment upon a lifting frame. The vertical leg of each fork is attached to the frame, while the horizontal legs project forwardly from the frame. The frame is adapted to move the forks up and down in a vertical direction so that the horizontal legs can be lowered for insertion beneath a load and then raised to lift the load. In addition, most lifting frames can be tilted rearwardly toward the truck thereby canting the load and thus preventing it from sliding forwardly on the forks.

Although a load situated between the canted forks of a lift is prevented from sliding longitudinally along the forks, it has been found that the load is still capable of sliding laterally thereby either dangerously unbalancing the load or allowing it to fall from the lift. In either case, the shifting load poses a danger to both workers and equipment. The load contacting surfaces of most forks are made of flat, high grade, steel which takes on a highly smooth, polished texture with use, thereby increasing the dangers associated with lateral load slippage.

Padgett, U.S. Pat. No. 3,777,923 discloses a pallet transport that has a pair of horizontally-extended lifting arms which can be inserted under a load bearing pallet. The arms are rotated upwardly about a pair of rear wheels to raise the pallet. Each arm is equipped with a longitudinal bar having sharp raised teeth cut therein. The teeth are designed to bite or dig into the bottom of the pallet to prevent it, and thus the load, from slipping when in transit. The teeth, although providing for the safety of the load, never-the-less cause considerable damage to the pallet each time the pallet is lifted. This type of device, therefore, is completely unsuited for lifting such things as stacked lumber, or the like, where the teeth come into direct harmful contact with the load.

Watkins in U.S. Pat. No. 2,659,506 describes a fork truck that is equipped with a pair of L-shaped lifting forks. Watkins recognizes that the load contacting surfaces of the forks do not provide sufficient frictional holding power to prevent even heavy loads from slipping or sliding thereon. Watkins provides the contact surfaces of his forks with a series of "grab blocks" which are carried in recesses formed in the forks. Each grab block contains a number of V-shaped ribs that are arranged to contact a load situated on the forks. Here again, in order to effectively prevent slippage, the ribs must dig into the load and thus can do harm to the load. Furthermore, the blocks and the recesses formed in the forks must be accurately machined to accept and securely hold the block. This considerably increases the overall cost of the lifting device.

SUMMARY OF THE INVENTION

It is therefore an object of the present invention to improve forks used in lifting devices such as forklift trucks.

It is another object of the present invention to prevent a load situated between the forks of a lifting device from slipping laterally over the load bearing surfaces.

A further object of the present invention is to provide a lifting fork with increased frictional holding power.

Yet another object of the present invention is to improve lifting forks so that they will provide greater load holding capacity without damaging a load carried thereon.

A still further object of the present invention is to provide a relatively inexpensive lifting fork that will reduce lateral slippage of loads situated thereon.

Yet another object of the present invention is to automatically increase the holding power of a lifting fork in response to the weight of the load thereby reducing the chance of operator error.

A still further object of the present invention is to provide a lifting fork that automatically increases its holding power as the weight of the load increases and which exhibits long life and low maintenance.

These and other objects of the present invention are attained by means of L-shaped forks that are suitable for use in a lifting device such as a forklift truck. Each fork includes a vertical leg that is attachable to a lifting frame and a horizontal leg having a flat upper surface for contacting and lifting a load seated thereon. The load contacting surface is provided with longitudinally-extended, spaced apart grooves. The grooves are generally rectangular, or U-shaped, in cross-section and are arranged to reduce the load contacting surface area of the fork thus greatly increasing the frictional forces acting between the load and the fork. Preferably, the contact area is reduced between 40 and 50 percent.

BRIEF DESCRIPTION OF THE DRAWINGS

For a better understanding of these and other objects of the present invention, reference shall be made to the following detailed description of the invention which is to be read in association with the accompanying drawings wherein.

DESCRIPTION OF THE INVENTION

Figure 1:
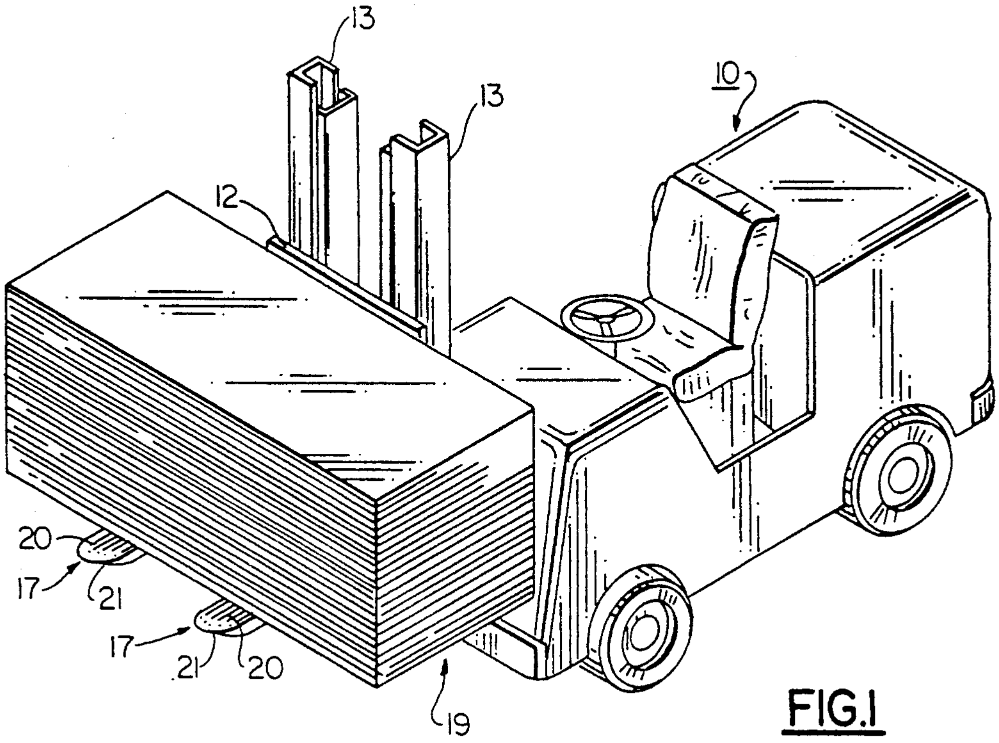
FIG. 1 is a perspective view of a forklift equipped with apparatus embodying the teachings of the present invention.

Referring to FIG. 1 there is shown a forklift truck 10 of conventional construction which is used to lift and transport various types of loads from place to place. The truck is equipped with a lifting frame 12 that is operatively connected to a pair of vertical rails 13—13. Although not shown, the rails are coupled to a truck-mounted drive mechanism that is controlled by the operator. The drive mechanism is capable of raising and lowering the lifting frame as well as rotating the rails about a pivot point located near the lower section of the rails so that the rails, and thus the frame, can be tilted toward or away from the truck.

Figure 3:
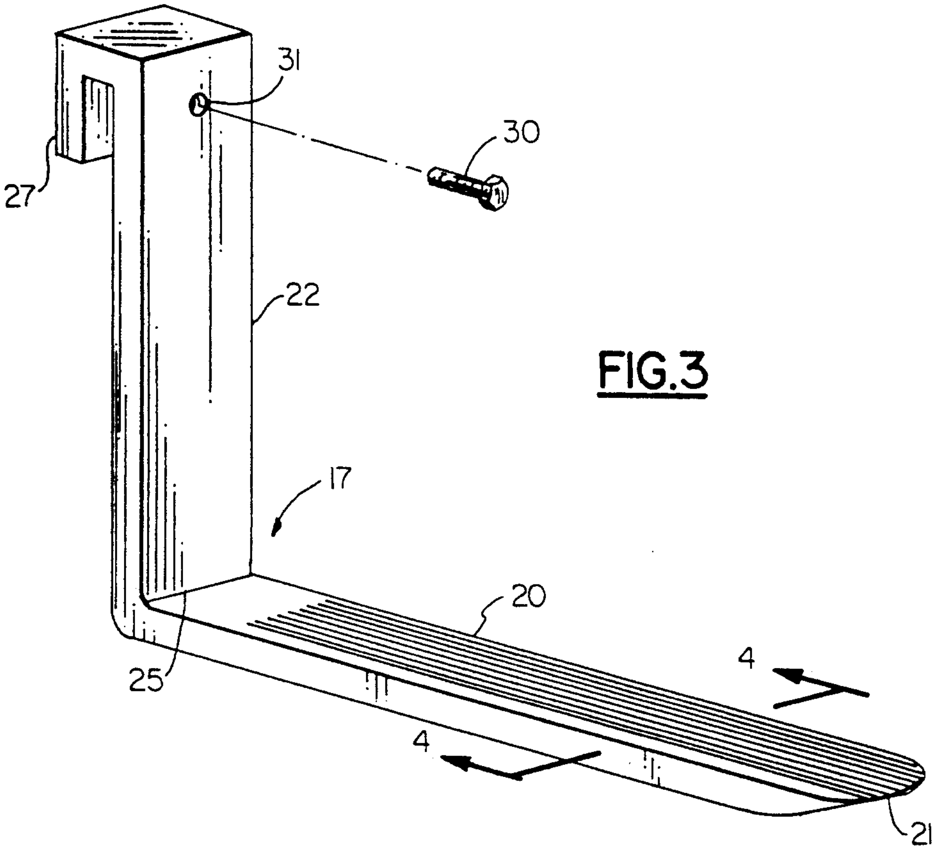
FIG. 3 is an enlarged perspective view of a grooved fork embodying the teaching of the present invention.

As will be explained in greater detail below, a pair of L-shaped forks 17—17 are attached to the lifting frame for movement therewith. An oriented strand board (OSB) unit 19 made up of eighty (80) 4'×8' panels of stacked wafer board is shown mounted upon the horizontal legs 20—20 of the forks. To insure that the OSB unit will not slide forwardly over the tips 21—21 of the forks, the rails are generally tipped rearwardly so that a portion of the load rests against the vertical legs 22—22 of the forks (FIG. 3). Although tipping the frame in this manner prevents the load from moving longitudinally along the legs 20—20 of the forks, the load is still capable of sliding laterally on the forks to produce a potentially hazardous, unbalanced condition. This lateral slippage is most pronounced when transporting flat-bottomed loads over uneven or inclined surfaces.

Figure 4:
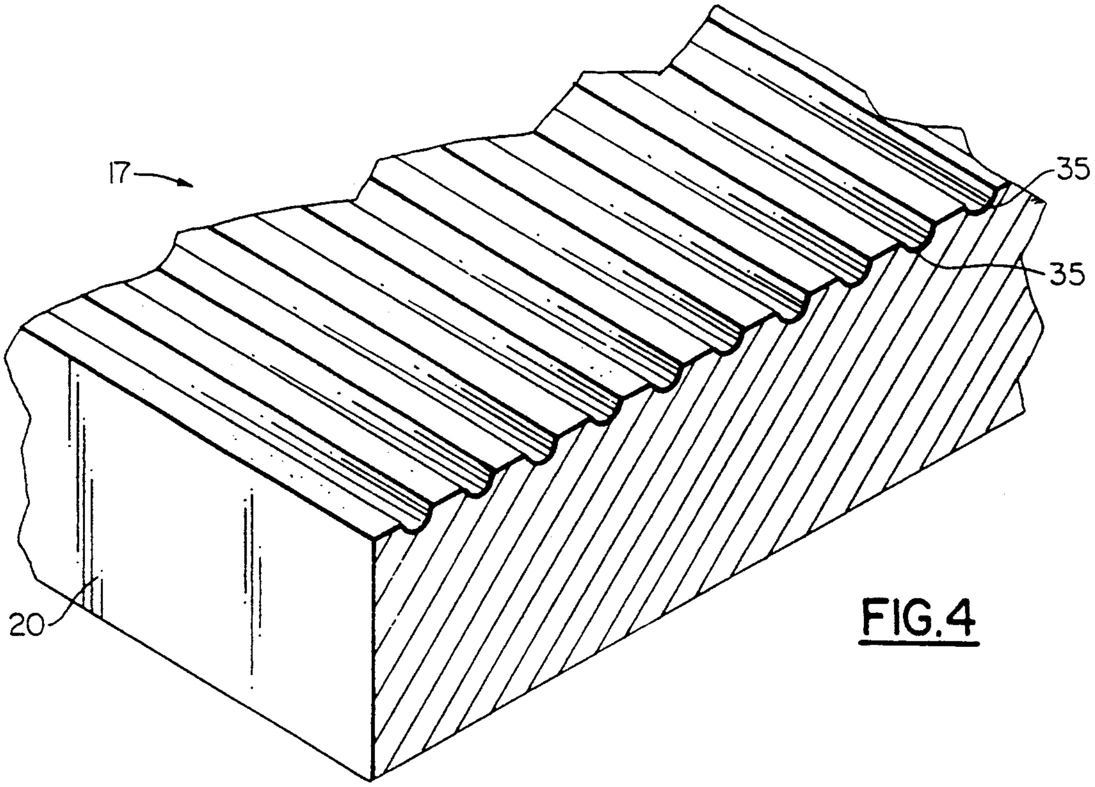
FIG. 4 is a further enlarged partial perspective view taken along lines 4—4 in FIG. 3 further showing the construction of the grooves formed in the fork.

Turning now to FIGS. 3 and 4, each fork is constructed of a single piece of high grade steel and has a vertical leg 22 that is joined at a right angle to the horizontal leg 20 at a knee 25. The upper section of the vertical leg contains a bracket 27 that can be slipped over the lifting frame and secured thereto by a set screw 30 which is threaded into tapped hole 31. Although a bracket and set screw arrangement is used herein to secure the forks to the lifting frame, it should be clear to one skilled in the art that any suitable means as known and used in the art may be similarly employed without departing from the teachings of the present invention.

A series of parallel grooves 35—35 are formed in the top surface of horizontal leg 20. This is the surface that comes into contact with the load. The grooves are extended longitudinally along the length of the leg 20. Each groove has a rectangular, or U-shaped, cross-section and the grooves are uniform in size and shape. The grooves are arranged so that the load contact surface area of the leg 20 is considerably reduced. Preferably, the contact area between the load and the fork is reduced between 40 and 50 percent.

As can be seen, this reduction in contact area greatly increases the frictional force acting between a given load and the fork. Accordingly, the tendency of the load to slip laterally on the forks is greatly reduced without having to resort to potentially harmful load engaging teeth or the use of expensive or complex holding fixtures.

Figure 2:
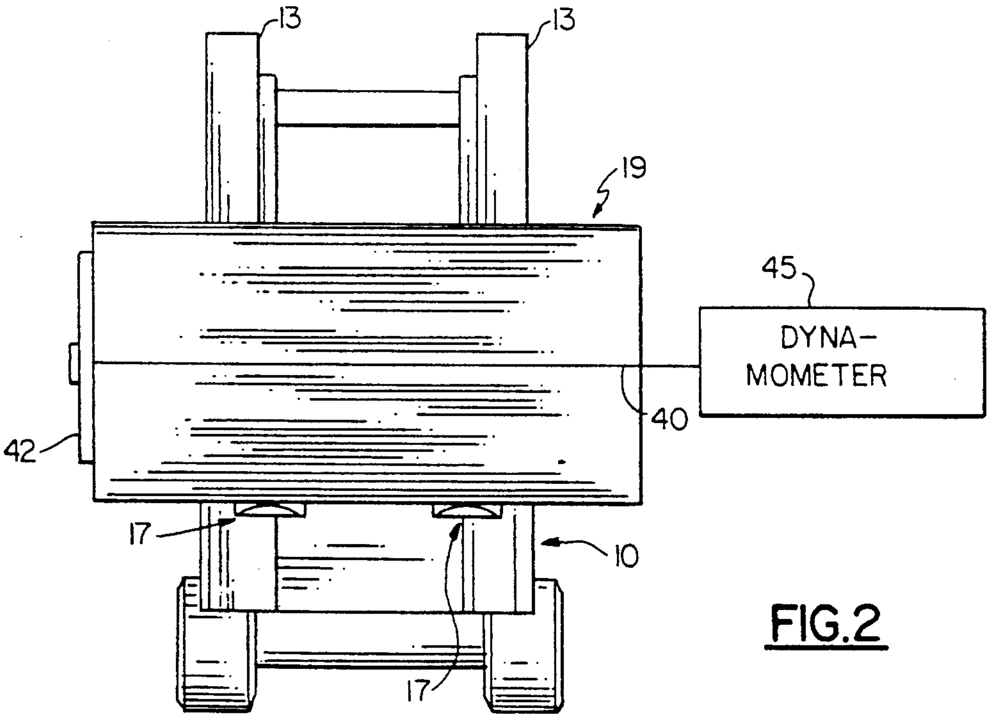
FIG. 2 is a front elevation of the forklift shown in FIG. 1 further illustrating test apparatus for measuring the load holding capacity of the forklift.

A dynamometer test was conducted to determine the increase in the load holding capability of grooved forks over ungrooved forks. The test set up is illustrated in FIG. 2. The initial test was carried out on a forklift truck equipped with standard size ungrooved forks. Each fork had a horizontal leg made of high grade steel that was 6" wide and 42" long. An 80 piece OSB unit was loaded onto the forks, as shown in FIG. 2, and the load centered between the vertical legs. A cable 40 was passed through the center of the OSB unit, with 40 panels on top and 40 panels beneath the cable. One end of the cable was attached to a face place 42 that was in contact with one end face of the unit. The other end of the cable was attached to a dynamometer 45. A pulling force was then exerted on the cable by the dynamometer and the force required to move the load laterally was noted. The test was repeated three times. The initial force required to move the load during the three tests was between 265 and 285 pounds.

The forks were then replaced with similar ones having grooved contacting surfaces as described above. Each six inch wide horizontal leg was provided with twenty (20) one-eighth inch wide, square-shaped grooves that extended back from the tip of the horizontal leg to about six inches from the knee. The test set-up remained the same and three tests were conducted on the grooved forks. The initial force required to move the load laterally during these tests ranged from 450 to 480 pounds, an increase of between 185-195 pounds over that of the ungrooved forks. These tests clearly demonstrated that the grooved forks increased substantially the frictional forces acting between the load and the forks and thus greatly increased the holding power of the system.

While this invention has been described with specific detail to the disclosure above, it is not necessarily limited to that description. Rather, any modifications and variations would present themselves to those skilled in the art without departing from the scope and spirit of this invention, as defined in the impending claims.

What is claimed is:

1. Apparatus for use in association with a fork lift truck for safely lifting and transporting stacked wooden loads that include a pair of spaced-apart, L-shaped metal forks that are capable of supporting the stacked wooden load therebetween, each fork including a vertical leg and a horizontal leg that are integrally joined at a knee, each vertical leg having means for attaching the fork to a lifting mechanism of said fork lift truck, each horizontal leg having a contacting upper surface adapted to move into lifting contact against a bottom surface of said stacked wooden load whereby the load is suspended between said forks, said load contacting, upper surface of each horizontal leg having a series of parallel grooves formed therein that extend from a distal tip of the horizontal leg rearwardly to about said knee, and each groove being uninterrupted along an entire length thereof and having a substantially constant cross-section along its entire length so as to reduce the total load contacting surface area of the horizontal leg by at least forty percent thereby increasing a frictional holding force acting between the load and the fork.

2. The apparatus of claim 1 wherein the grooves are about one-eight of an inch wide.

3. The apparatus of claim 1 wherein the load contacting surface of each horizontal leg is about six inches wide.

4. The apparatus of claim 1 wherein the load contacting surface of each horizontal leg is roughened between the grooves.

* * * * *